(12) United States Patent
Voss et al.

(10) Patent No.: US 9,100,574 B2
(45) Date of Patent: Aug. 4, 2015

(54) DEPTH MASK ASSISTED VIDEO STABILIZATION

(75) Inventors: Shane D. Voss, Fort Collins, CO (US); Oscar A. Zuniga, Fort Collins, CO (US); Jason E. Yost, Windsor, CO (US); Kevin Matherson, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/346,390

(22) PCT Filed: Oct. 18, 2011

(86) PCT No.: PCT/US2011/056673
§ 371 (c)(1),
(2), (4) Date: Mar. 21, 2014

(87) PCT Pub. No.: WO2013/058735
PCT Pub. Date: Apr. 25, 2013

(65) Prior Publication Data
US 2014/0253746 A1 Sep. 11, 2014

(51) Int. Cl.
*H04N 5/232* (2006.01)
*G06T 5/00* (2006.01)

(52) U.S. Cl.
CPC ............ *H04N 5/23248* (2013.01); *G06T 5/003* (2013.01); *G06T 2207/10028* (2013.01); *G06T 2207/20164* (2013.01); *G06T 2207/20201* (2013.01)

(58) Field of Classification Search
CPC .................. H04N 5/23254; H04N 5/23252
USPC .................. 348/208.99, 208.1, 208.4, 208.5; 382/282–287
See application file for complete search history.

(56) References Cited

U.S. PATENT DOCUMENTS

| | | | |
|---|---|---|---|
| 4,349,254 | A | 9/1982 | Jyojiki et al. |
| 5,631,697 | A | 5/1997 | Nishimura et al. |

(Continued)

FOREIGN PATENT DOCUMENTS

| | | |
|---|---|---|
| JP | H05191708 | 7/1993 |
| JP | 2001-184523 A | 7/2001 |
| TW | 571583 | 1/2004 |

OTHER PUBLICATIONS

Aum Sri Sairam, "Plenoptic camera and its Applications," Nov. 11, 2005, <http://prashub.com/prasanna/files/Plenoptic_Prasanna_Pavani_2005.pdf>.

(Continued)

*Primary Examiner* — Tuan Ho
(74) *Attorney, Agent, or Firm* — Brooks, Cameron & Huebsch, PLLC (57) ABSTRACT

Systems (490), methods (340), and machine-readable and executable instructions (428) are provided for depth mask assisted video stabilization. Depth mask assisted video stabilization can include creating a first depth mask from a first frame (101, 201) and a second depth mask from a second frame (102, 202) to obtain depth information (342) and defining a first list of feature points (111-1a, 111-2a, 111-3a, 111-4a, 113-1a, 113-2a, 113-3a, 113-4a, 113-5a) from the first frame (101, 201) and a second list of feature points (111-1b, 111-2b, 111-3b, 111-4b, 113-1b, 113-2b, 113-3b, 113-4b, 113-5b) from the second frame (102, 202) (344). Depth mask assisted video stabilization can also include comparing feature points from the first list of feature points (111-1a-111-4a, 113-1a-113-5a) with feature points from the second list of feature points (111-1b-111-4b, 113-1b-113-5b) to find a number of common feature point pairs (111-1a, 111-1b), (111-2a, 111-2b), (111-3a, 111-3b), (111-4a, 111-4b), (113-1a, 113-1b), (113-2a, 113-2b), (113-3a, 113-3b), (113-4a, 113-4b), (113-5a, 113-5b)) (345) and creating a number of motion matrices from the common feature point pairs ((111-1a, 111-1b), (111-2a, 111-2b), (111-3a, 111-3b), (111-4a, 111-4b), (113-1a, 113-1b), (113-2a, 113-2b), (113-3a, 113-3b), (113-4a, 113-4b), (113-5a, 113-5b)) (346). Depth mask assisted video stabilization can also include including the motion matrices in a correction matrix (348) and applying the inverse of the correction matrix to the second frame (102, 202) to perform video stabilization (350).

15 Claims, 4 Drawing Sheets

(56) References Cited

U.S. PATENT DOCUMENTS

| | | | |
|---|---|---|---|
| 6,226,388 | B1 | 5/2001 | Qian et al. |
| 6,229,913 | B1 | 5/2001 | Nayar et al. |
| 6,233,008 | B1 | 5/2001 | Chun |
| 6,252,974 | B1 | 6/2001 | Martens et al. |
| 6,507,366 | B1 | 1/2003 | Lee |
| 6,909,455 | B1 | 6/2005 | Edwards et al. |
| 7,142,315 | B1 | 11/2006 | Lange et al. |
| 7,173,650 | B2 | 2/2007 | Cohen-Solal et al. |
| 7,620,309 | B2 | 11/2009 | Georgiev |
| 7,636,486 | B2 * | 12/2009 | Steinberg et al. ............. 382/255 |
| 7,711,201 | B2 | 5/2010 | Wong et al. |
| 7,733,412 | B2 | 6/2010 | Takayama |
| 7,792,423 | B2 | 9/2010 | Raskar et al. |
| 7,911,513 | B2 | 3/2011 | Garrison et al. |
| 7,962,033 | B2 | 6/2011 | Georgiev et al. |
| 8,477,200 | B2 * | 7/2013 | Fujita et al. ............. 348/208.13 |
| 8,760,513 | B2 * | 6/2014 | Strine et al. .................... 348/143 |
| 2004/0189804 | A1 | 9/2004 | Borden et al. |
| 2007/0019883 | A1 | 1/2007 | Wong et al. |
| 2007/0040924 | A1 | 2/2007 | Cho et al. |
| 2007/0189750 | A1 | 8/2007 | Wong et al. |
| 2007/0200930 | A1 | 8/2007 | Gordon |
| 2008/0007626 | A1 | 1/2008 | Wernersson |
| 2008/0232716 | A1 | 9/2008 | Plagne |
| 2009/0066693 | A1 | 3/2009 | Carson |
| 2009/0167923 | A1 | 7/2009 | Safaee-Rad et al. |
| 2009/0185801 | A1 | 7/2009 | Georgiev et al. |
| 2009/0244090 | A1 | 10/2009 | Zhang et al. |
| 2010/0026852 | A1 | 2/2010 | Ng et al. |
| 2010/0128145 | A1 | 5/2010 | Pitts et al. |
| 2010/0177979 | A1 | 7/2010 | Kotani |
| 2010/0194741 | A1 | 8/2010 | Finocchio |
| 2010/0201865 | A1 | 8/2010 | Han et al. |
| 2010/0208941 | A1 | 8/2010 | Broaddus et al. |
| 2010/0309201 | A1 | 12/2010 | Lim et al. |
| 2011/0069064 | A1 | 3/2011 | Zhang et al. |
| 2011/0069324 | A1 | 3/2011 | Kang et al. |
| 2011/0080491 | A1 | 4/2011 | Drazic et al. |
| 2011/0110583 | A1 | 5/2011 | Zhang et al. |
| 2011/0129165 | A1 | 6/2011 | Lim et al. |
| 2011/0150321 | A1 | 6/2011 | Cheong et al. |
| 2011/0293179 | A1 | 12/2011 | Dikmen et al. |

OTHER PUBLICATIONS

Chan et al., "An Object-based Approach to Plenoptic Video Processing," IEEE International Symposium on Circuits and Systems, 2007, ISCAS 2007, May 2007, pp. 985-988.

Chan, S.C. et al., "An Object-based Approach to Image/video-based Synthesis and Processing for 3-D and Multiview Televisions," IEEE Transactions on Circuits and Systems for Video Technology, Jun. 2009, pp. 821-831, vol. 19, No. 6.

Chang, I. et al., "Human Activity Linkage Recording for Multiple Cameras with Disjoint Views," (Research Paper), Proceedings of the 2010 Sixth International Conference on Intelligent Information Hiding and Multimedia Signal Processing, 2010, pp. 635-638, IEEE Computer Society Washington, DC, USA.

Chen, Chong Ph.D., "Multi-camera Vision Systems: Pose Estimation and Plenoptic Imaging," University of Illinois at Chicago, 2010, 143 pages, 3417336.

Denzler et al., "Plenoptic Models in Robot Vision," KI, vol. 17, No. 3, 2003.

English translation (machine-generated) of Abstract from Japanese Patent No. H5191708 [retrieved on May 8, 2014], Retrieved from the Internet: http://worldwide.espacenet.com/publicationDetails/biblio?DB=EPODOC&II=4&ND=3&adjacent=true&locale=en_EP&FT=D&date=19930730&CC=JP&NR=H05191708A&KC=A.

English translation (machine-generated) of abstract from Taiwanese Patent No. 571583 [retrieved on May 8, 2014], Retrieved from the Internet: http://worldwide.espacenet.com/publicationDetails/biblio?CC=TW&NR=571583B&KC=B&FT=D&ND=3&date=20040111&DB=EPODOC&locale=en_EP.

Gan et al., "Object tracking for a class of dynamic image-based representations," SPIE Conference on Visual Communications and Image Processing 2005, Beijing, China, Jul. 12-15, 2005, v. 5960, p. 59603Q-1-59603Q-8.

Georgiev et al., "Rich Image Capture with Plenoptic Cameras," 2010 IEEE International Conference on Computational Photography (ICCP), 2010, pp. 1-8.

Georgiev, T. et al., "Focused Plenoptic Camera and Rendering," Journal of Electronic Imaging, vol. 19, No. 2, 2010, 021106-021106.

Georgiev, T., "New results on the Plenoptic 2.0 camera," 2009 Conference Record of the Forty-Third Asilomar Conference on Signals, Systems and Computers, 2009, pp. 1243-1247.

Groves, Doug, "Lytro lets users focus on capturing the moment, not fiddling with auto focus," RGB Filter, (website), Jun. 22, 2011, <http://www.rgbfilter.com/?p=15097>.

Harville et al., "3d pose tracking with linear depth and brightness constraints," The Proceedings of the Seventh IEEE International Conference on Computer Vision, 1999, vol. 1, pp. 206-213.

Isaksen, A., "Dynamically reparameterized light fields," Proceedings of the 27th annual conference on Computer graphics and interactive techniques, Jul. 2000, pp. 297-306, ACM Press/Addison-Wesley Publishing Co.

Joshi et al., "Synthetic aperture tracking: tracking through occlusions," (website), Jan. 7, 2008, <http://web.archive.org/web/20080107063815/http://vision.ucsd.edu/kriegman-grp/research/synthetic_ap_tracking/>.

Joshi et al., "Synthetic aperture tracking: tracking through occlusions," IEEE 11th International Conference on Computer Vision, 2007, ICCV 2007, Oct. 2007, pp. 1-8.

Koch et al., "Calibration of Hand-held Camera Sequences for Plenoptic Modeling," The Proceedings of the Seventh IEEE International Conference on Computer Vision, 1999, vol. 1, pp. 585-591.

Levin et al., "Image and depth from a conventional camera with a coded aperture," ACM Transactions on Graphics (TOG), vol. 26, No. 3, 2007.

Levin, Anat, "Analyzing Depth from Coded Aperture Sets," Computer Vision—ECCV 2010, Springer Berlin Heidelberg, 2010, pp. 214-227.

Levoy et al., "Light field rendering," Proceedings of the 23rd annual conference on Computer graphics and interactive techniques, 1996, pp. 31-42, ACM.

Mark R, "Pelican Imaging's Plenoptic camera for camera phones," (webpage), Feb. 10, 2011, <http://www.coolest-gadgets.com/20110210/pelican-imagings-plenoptic-camera-camera-phones/>.

Morency et al., "Fast stereo-based head tracking for interactive environments," Proceedings, Fifth IEEE International Conference on Automatic Face and Gesture Recognition, May 2002, pp. 390-395.

Ng et al., "Light field photography with a hand-held plenoptic camera," Computer Science Technical Report CSTR, vol. 2, No. 11, 2005.

Ng, Ren, "Digital Light Field Photography," Dissertation, Stanford University, Jul. 2006, <http://testcis.cis.rit.edu/~cnspci/references/dip/light_field_photography/ng2006.pdf>.

Russakoff et al., "Head tracking using stereo," Machine Vision and Applications, vol. 13, No. 3, 2002, pp. 164-173.

Vaish et al., "Using plane + parallax for calibrating dense camera arrays," Proceedings of the 2004 IEEE Computer Society Conference on Computer Vision and Pattern Recognition, 2004, CVPR 2004, Jun. 2004, vol. 1.

Wong, Earl, "A new method for creating a depth map for camera auto focus using an all in focus picture and 2d scale space matching." Proceedings IEEE International Conference on Acoustics, Speech and Signal Processing, 2006, ICASSP 2006, vol. 3, pp. III 1184-III 1187.

(56) References Cited

OTHER PUBLICATIONS

English translation (machine-generated) of Abstract from Japanese Patent Publication No. 2001-184523A [retrieved on Mar. 6, 2014], Retrieved from the Internet: <http://worldwide.espacenet.com/publicationDetails/biblio?DB=worldwide.espacenet.com&II=1&ND=3&adjacent=true&locale=en_EP&FT=D&date=20010706&CC=JP&NR=2001184523A&KC=A>.

International Search Report and Written Opinion, Apr. 13, 2012, PCT Application No. PCT/US2011/056673.

Long, Ben., "Review: Alien Skin Bokeh," retrieved from http://www.creativepro.com/article/review-alien-skin-bokeh, Published: Oct. 21, 2009, 11 pages.

Unknown., "Never Take an Out-of-focus Picture Again: Adobe's New Plenoptic Lens Tech," retrieved from http://www.pentaxforums.com/forums/general-photography/116294-never-take-out-focus-picture-again-adobe-s-new-plenoptic-lens-tech-2.html, viewed on Jun. 17, 2011, 4 pages.

* cited by examiner

DEPTH MASK ASSISTED VIDEO STABILIZATION

CROSS-REFERENCE TO RELATED APPLICATION

This application is a U.S. National Stage Application of and claims priority to International Patent Application No. PCT/US2011/056673, filed on Oct. 18, 2011, and entitled "DEPTH MASK ASSISTED VIDEO STABILIZATION".

BACKGROUND

Digital video, such as that obtained from digital cameras, digital video recorders, or other digital imagers often contain undesirable motion between successive image frames. Using all motion vectors to remove the unintended motion may produce a correction vector. However, this approach may result in an inaccurate correction vector and in inefficient use of resources.

DETAILED DESCRIPTION

Examples of the present disclosure may include methods, systems, and machine-readable and executable instructions and/or logic. An example method for depth mask assisted video stabilization may include creating a first depth mask from a first frame and a second depth mask from a second frame to obtain depth information and defining a first list of feature points from the first frame and a second list of feature points from the second frame. Moreover, an example method for depth mask assisted video stabilization may further include comparing feature points from the first list of feature points with feature points from the second list of feature points to find a number of common feature point pairs and creating a number of motion matrices from the common feature point pairs. An example method for depth mask assisted video stabilization may also include including the motion matrices in a correction matrix and applying the inverse of the correction matrix to the second frame to perform video stabilization.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 116 may reference element "16" in FIG. 1, and a similar element may be referenced as 216 in FIG. 2.

Video stabilization is a process that can correct for unintended motion between successive image frames while retaining intended motion. Unintended motion can also be the result of hand shaking or wobbling among other reasons. An example of intended motion may be the operator panning the video camera. Motion may contain horizontal and vertical translation, rotation and scaling. Video stabilization should only correct for the unintended motion.

In one example of the disclosure, depth information is gathered through the use of a camera system capable of determining depth such as a plenoptic camera, which produces a depth mask. A depth mask is a 2D image map indicating the distance from the camera on the z-axis (e.g., distance between the camera and the subject) for pixels. In the present disclosure a depth mask is associated with an image that allows pixels (e.g., every pixel) in an image to have a depth. Additionally, the x-axis is used to determine distance in a horizontal direction, and the y-axis is used to determine distance in a vertical direction.

Figure 1:
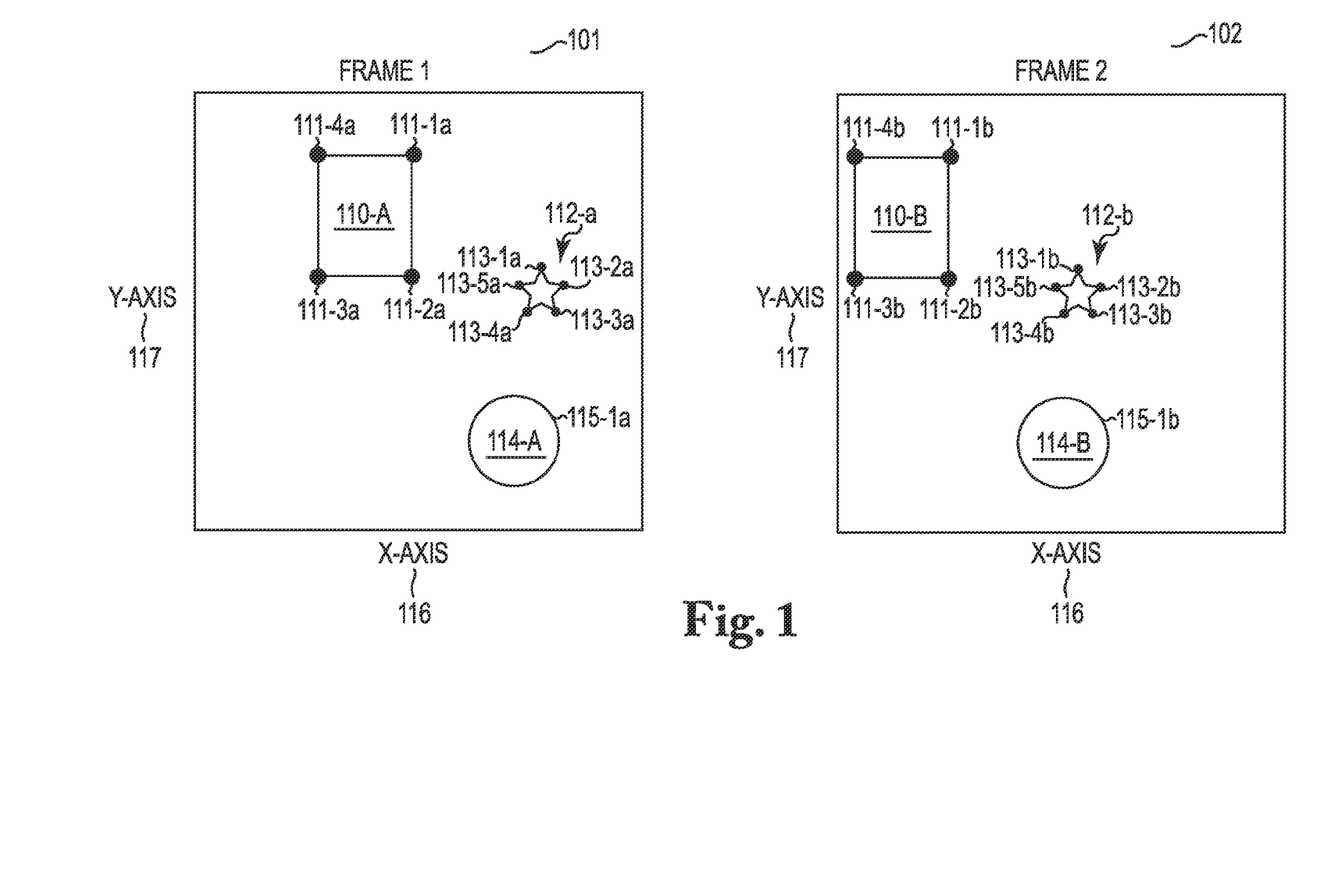
FIG. 1 illustrates a diagram of global motion according to the present disclosure.

FIG. 1 illustrates a diagram of global motion according to the present disclosure. Frame 1 101 represents a first image and frame 2 102 represents a second image. Frame 1 101 and frame 2 102 are successive images that include an x-axis 116 (e.g., horizontal distance) and a y-axis 117 (e.g., vertical distance). Frame 1 101 and frame 2 102 contain a square 110-A, 110-B, a star 112-A, 112-B, and a circle 114-A, 114-B. Each of the three objects is illustrated in a different size. Square 110-A, 110-B is the largest object; circle 114-A, 114-B is the second largest objected; star 112-A, 112-B is the smallest object. For convenience, the different sizes represent depth. As a result, square 110-A, 110-B has the smallest depth, circle 114-A, 114-B, has a medium depth, and star 112-A, 112-B, has the largest depth.

Global motion may be unintended motion between successive image frames that can be the result of hand shaking, movement while operating a video imager, or other forms of unintended motion. One example of global motion can be seen in the motion between frame 1 101 and frame 2 102. Frame 2 102 contains global motion as the majority of the objects in frame 1 101 and frame 2 101 (e.g., square 110-A, 110-B, star 112-A, 112-B, and circle 114-A, 114-B) move in uniformity along the x-axis 116 from frame 1 101 to frame 2 102.

Square 110-A, 110-B and star 112-A, 112-B can contain feature points. Square 110-A, 110-B can contain feature points 111-1a, 111-1b, 111-2a, 111-2b, 111-a, 111-3b, and 111-4a, 111-4b while star 112-A, 112-B can contain feature points 113-1a, 113-1b, 113-2a, 113-2b, 113-3a, 113-3b, 113-4a, 113-b, and 113-5a, 113-5b. Pixels can be local if they are in close proximity on the x-axis 116 and y-axis 117. A feature point is a local group of pixels that are at a common depth where pixels are local if they are in close proximity to each other. A feature point can be further qualified based on contrast, uniqueness, and spatial location. For example, the pixels in frame 1 101 that make up square 110-A are at a common depth along the z-axis 116. Further, the pixels that make up square 110-A can be qualified based on contrast as the pixels that make up square 110-A are black and the pixels that make up the background are white. Moreover, the pixels that make up the points 111-1a, 111-2a, 111-3a, and 111-4a are unique as the pixels form a right angle. Circle 114-A. 114-B can contain depth object 115-1a, 115-1b. A depth object is a grouping of pixels that are at a common depth. For example, the pixels that makeup the outline of circle 114-A are pixels at a common depth along the z-axis. Further, a depth object is different than a feature point in that a depth object is not limited to a local grouping of pixels. Feature points and depth objects are used to identify movement within a first frame and a second frame. For example, feature points, depth objects, and common depth objects can be used to identify movement between frame 1 101 and frame 2 102. A common depth object is defined as a grouping of feature point pairs. For example square 110-A in frame 1 101 and 110-B in frame 2 102 illustrate the same object therefor square 110-A and 110-B may contain similar feature points which are called feature point pairs. The feature point pairs (e.g., (111-1a, 111-1b), (111-2a, 111-2b), (111-3a, 111-3b), (111-4a, 111-4b)) can be grouped together to define a square (e.g., 110-A, 110-B) object. This, grouping of feature point pairs is called a common depth object.

Although examples of the present disclosure are described with respect to two frames, examples are not so limited. The present disclosure can be practiced with any number of frames.

Figure 2:
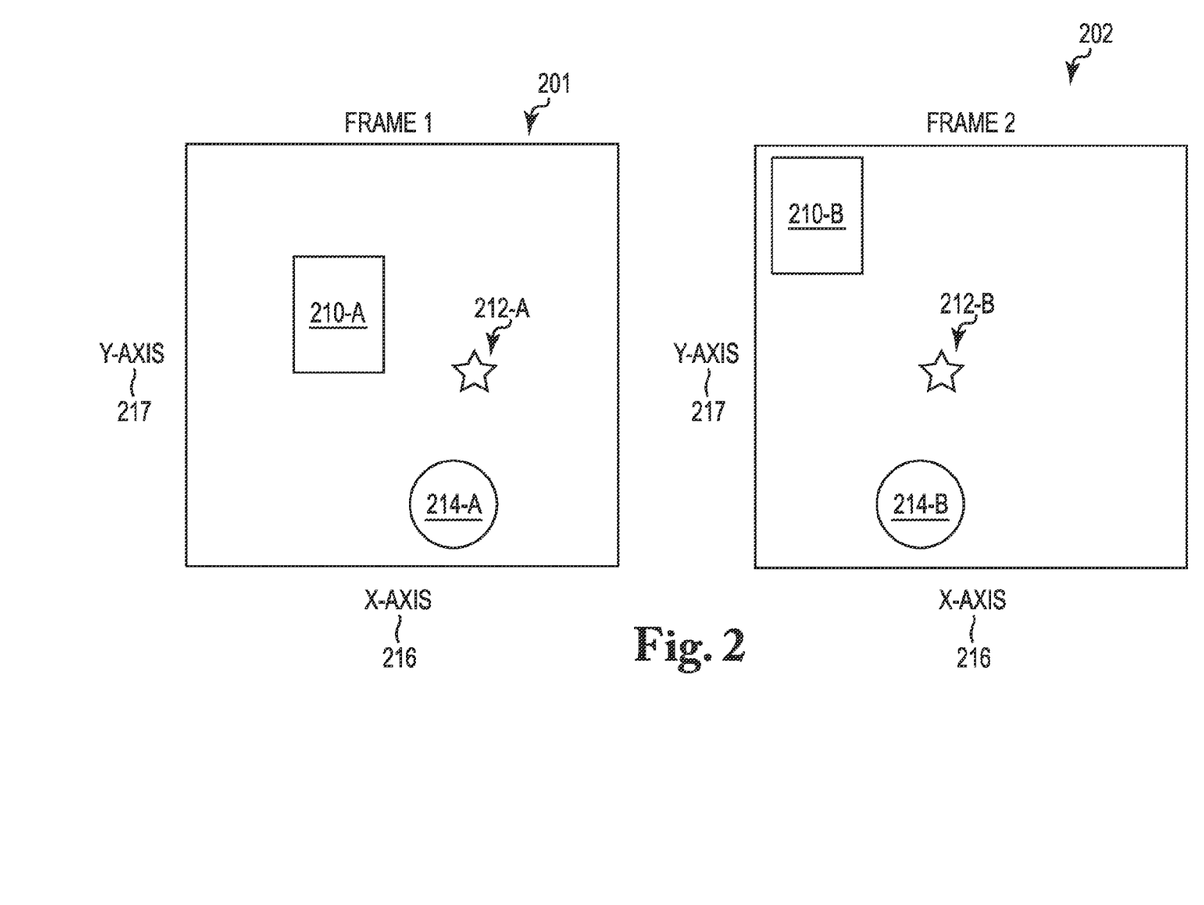
FIG. 2 illustrates a diagram of subject motion according to the present disclosure.

FIG. 2 illustrates a diagram of subject motion according to the present disclosure. Frame 1 201 represents a first image and frame 2 202 represents a second image. Frame 1 201 and frame 2 202 are successive images that include an x-axis 216 and a y-axis 217. Within frame 1 201 and frame 2 202 a square 210-A, 210-B, a star 212-A, 212-B, and a circle 214-A, 214-B are illustrated. Subject motion is the movement of a subject in the image rather than apparent movement caused by movement of the video imager. Subject motion can further be defined as a motion matrix that is different than the majority of the motion matrices within two consecutive frames. A motion matrix is a matrix that defines the motion of an object between two consecutive frames. The motion matrix can describe horizontal and vertical translation motion along the x-axis and y-axis axis, rotational motion around the z-axis, and scaling along the z-axis. For example, star 212-A, 212-B moves between frame 1 201 and frame 2 202 along the x-axis 216. The movement can be defined in a motion matrix.

Motion matrices can be created from square 210-A, 210-B, star 212-A, 212-B, and circle 214-A, 214-B. For example, square 210-A, 210-B can have a motion matrix that describes the square's 210-A, 210-B movement along the x-axis 216 and y-axis 217. Star 212-A, 212-B and circle 214-A, 214-B have motion along the x-axis 216 and can have a motion matrix that describes the same motion. The majority of the motion matrices (e.g., star 212-A, 212-B and circle 214-A, 214-B) have movement in the x-axis 216 which results in a global motion classification. Square 210-A, 210-B has a unique motion matrix which results in a subject motion classification. In some examples of the present disclosure, motion matrices with subject motion are identified but not included in a correction matrix. A correction matrix describes the unintended movement of the video imager such that a correction matrix is a matrix that describes global motion.

Figure 3:
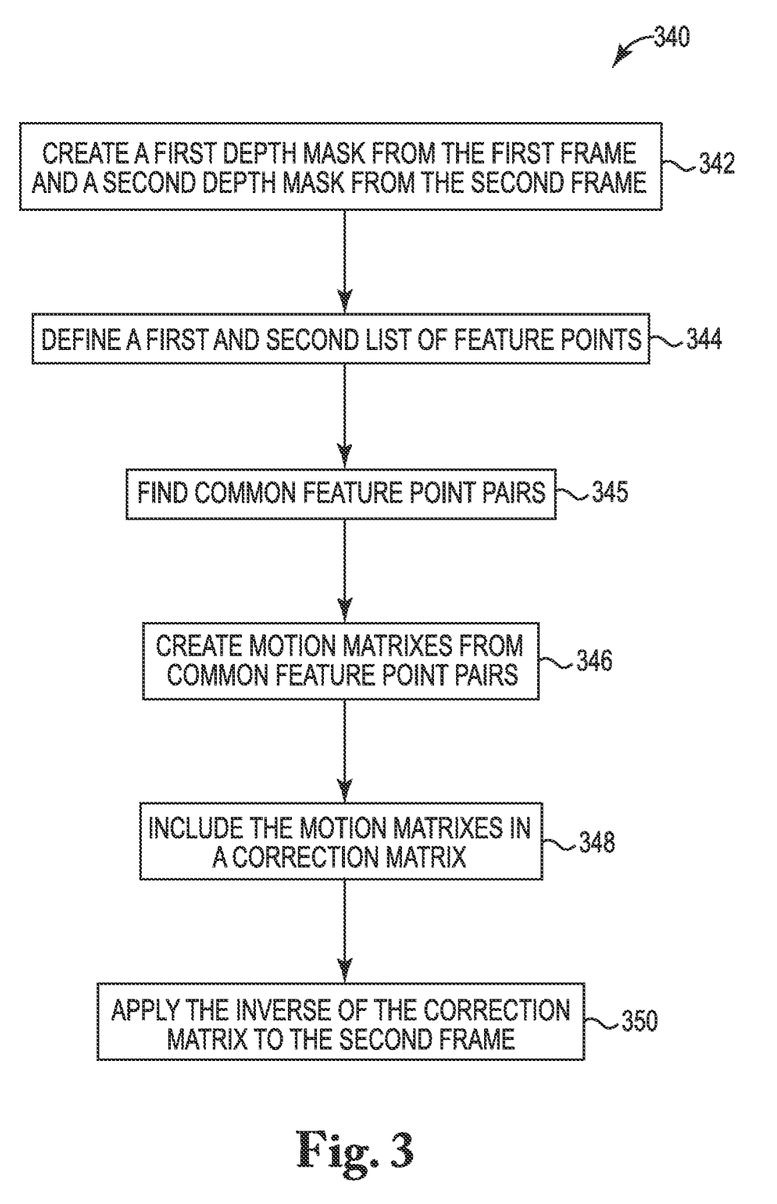
FIG. 3 is a flow chart illustrating an example of a method for depth mask assisted video stabilization according to the present disclosure.

FIG. 3 is a flow chart illustrating an example of a method for depth mask assisted video stabilization according to the present disclosure. The method 340 can stabilize a second image by using a depth mask to more efficiently create a correction matrix from a first and second image. The correction matrix can then be applied to the second image to perform video stabilization.

At 342, a first depth mask from the first frame and a second depth mask from the second frame are created. For example, a first depth mask can be created from frame 1 101 and a second depth mask can be created from frame 2 102 as illustrated in FIG. 1. The first and second depth masks contain depth information for the pixels in the first and second frames respectively so that pixels (e.g., every pixel) in the first and second frames contain depth information.

At 344, a first and a second list of feature points are defined. For example, feature points 111-1a, 111-2a, 111-3a, and 111-4a and 113-1a, 113-2a, 113-3a, 113-4a, and 113-5a can be defined from frame 1 101 and feature points 111-1b, 111-2b, 111-3b, and 111-4b and 113-1b. 113-2b. 113-3b. 113-4b, and 113-5b can be defined from frame 2 102 as illustrated in FIG. 1.

In a number of examples of the present disclosure, the pixels are grouped together according to depth to create feature points. In some examples of the present disclosure, local pixels are grouped together according to depth and spatial location. For example, pixels that are at a similar depth along the z-axis and at a similar location on the x-axis and y-axis can be grouped together. The pixel groups can further be analyzed based on contrast, uniqueness, and spatial location. For example, the pixels that make up points 111-1a, 111-2a, 111-3a, and 111-4a, as illustrated in FIG. 1, can be differentiated from the other pixels due to the depth and special location of the pixels. Additionally, the points can further be differentiated from the other pixels due to uniqueness as all four points create corners.

In some examples of the present disclosure, pixels can be grouped together to create depth objects. Additionally, pixels at a common depth can be grouped together to create depth objects. For example, the pixels represented in 115-1a and 115-1b, as illustrated in FIG. 1, can be grouped together to represent depth objects as they are at a common depth.

At 345, common feature point pairs from the first and second frames are created. For example, as illustrated in FIG. 1, the feature points from frame 1 101 can be compared to the feature points from frame 2 102 to find a number of common feature points pairs. Common feature point pairs can be feature points in one frame that have common characteristics with feature points in another frame. For example, feature point 111-1a represents the right topmost region of square 110-A in frame 1. In frame 2 102 the right topmost region of square 110-B is feature point 111-1b. Moreover, feature points 111-1a and 111-1b can be common feature point pairs. In some examples of the present disclosure, comparing feature points can include comparing all feature points in the first frame with all feature points in the second frame. With respect to FIG. 1, the following common feature point pairs can be created; (111-1a, 111-1b), (111-2a, 111-2b), (111-3a, 111-3b), (111-4a, 1114b), (113-1a, 113-1b), (113-2a, 113-2b), (113-3a, 113-3b), (113-4a, 113-4b), and (113-5a, 113-5b). In a number of examples of the present disclosure, comparing feature points can includes comparing feature points that are at a common depth. For example, with respect to FIG. 1, feature point 111-1a in frame 1 101 can be compared to feature points 111-1b, 111-2b, 111-3b, and 111-4b in frame 2 102 and not feature points 113-1b, 113-2b, 113-2b, 113-4b and 113-5b.

In some examples of the present disclosure, depth objects from the first frame can be compared to depth objects from the second frame to find a number of common depth object pairs. Common depth object pairs can be depth objects in one frame that have common characteristics to depth objects in another frame. For example, with respect to FIG. 1, depth object 115-1a in frame 1 101 can represent the pixels that create the outline of circle 114-A. Additionally, depth object 115-1b in frame 2 102 can represent the pixels that create the outline of circle 114-B. Depth objects can also be compared. For example, comparing depth objects can include comparing depth objects in the first frame with depth objects in the second frame to create a common depth object pair (e.g., (115-1a, 115-1b) as illustrated in FIG. 1). In a number of examples of the present disclosure, comparing depth objects can include comparing depth objects that are at a common depth.

In a number of examples of the present disclosure, a number of common depth objects can be created from the common feature point pairs. For example, with respect to FIG. 1, the feature point pairs (111-1a, 111-1b), (111-2a, 111-2b), (111-3a, 111-3b), and (111-4a, 111-4b) have common characteristics such that they can be grouped to form a common depth object. The feature point pairs (113-1a, 113-1b), (113-2a, 113-2b), (113-3a, 113-3b), (113-4a, 113-4b), and (113-5a, 113-5b), as illustrated in FIG. 1, can also be grouped into a common depth object. In some examples, common depth objects can be created by grouping a number of common feature point pairs based on depth and spatial location within the first and second frame.

At 346, a number of motion matrices are created from feature point pairs. For example, a best fit operation can be performed on common feature point pairs. The best fit operation can take the common feature point pairs and create motion matrices. A motion matrix can describe motion, if any, between the first frame and the second frame as it pertains to feature points, depth objects, or common depth objects. For example, common feature point pair (111-1a, 111-1b) as illustrated in FIG. 1 contains motion along the x-axis. The same is true for the common feature point pairs in the first frame and the second frame.

In a number of examples of the present disclosure, a number of motion matrices can be created from common depth object pairs. The best fit operation can be performed on common depth object pairs. The best fit operation can take a common depth object pair and create a motion matrix. For example, the best fit operation can be applied to the common depth object pair (115-1a, 115-1b), as illustrated in FIG. 1, to create a motion matrix.

In some examples of the present disclosure, the best fit operation can be performed on the common depth objects to create a number of motion matrices. Performing the best fit operation on common depth objects can entail performing the best fit operation on the common feature point pairs that compose a common depth object. For example, with respect to FIG. 1, the best fit operation can be performed on feature point pairs (111-1a, 111-1b), (111-2a, 111-2b), (111-3a, 111-3b), and (111-4a, 111-4b), which together can create a common depth object. Each feature point pair can produce a motion matrix and including these in the best fit operation can create a motion matrix for the common depth object. Likewise, the best fit operation can also be performed on the (113-1a, 113-1b), (113-2a, 113-2b), (113-3a, 113-3b), (113-4a, 113-4b), and (113-5a, 113-5b) feature point pairs, as illustrated in FIG. 1, which together can create a common depth object such that each feature point pair produces a motion matrix, including each matrix to find the best fit creates a motion matrix for the common depth object.

At 348, the motion matrices are then included in a correction matrix. The correction matrix represents the unintended motion between the first frame and the second frame. In some examples of the present disclosure, motion matrices that do not contain subject motion are included in the correction matrix, while motion matrices that include subject motion are excluded from the correction matrix.

At 350, the inverse of the correction matrix is applied to the second frame to perform video stabilization. Since the correction matrix describes global motion (e.g., unintended motion), applying the inverse of the correction matrix removes (e.g., corrects) the unintended motion from the second frame.

Figure 4:
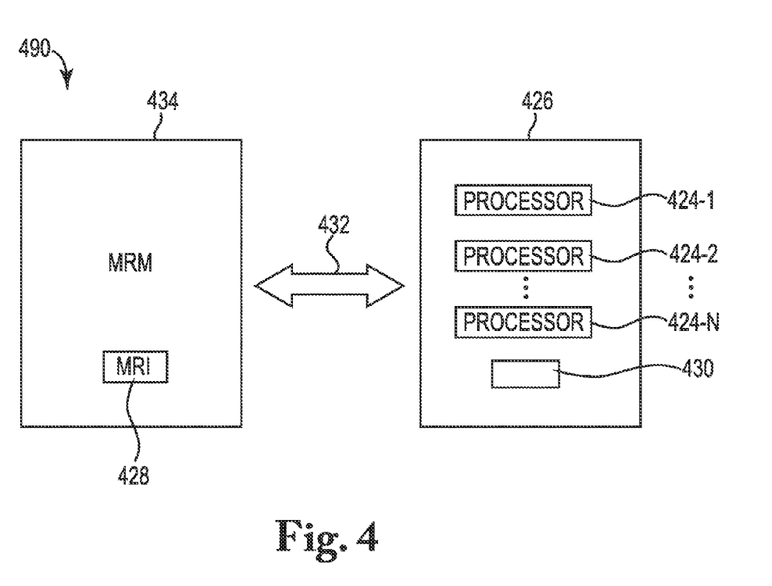
FIG. 4 illustrates a block diagram of an example of a machine-readable medium in communication with processing resources for depth mask assisted video stabilization according to the present disclosure.

FIG. 4 illustrates a block diagram 490 of an example of a machine-readable medium (MRM) 434 in communication with processing resources 424-1, 424-2 . . . 424-N for depth mask assisted video stabilization according to the present disclosure. MRM 434 can be in communication with a computing device 426 (e.g., an application server, having processor resources of more or fewer than 424-1, 424-2 . . . 424-N). The computing device 426 can be in communication with, and/or receive a tangible non-transitory MRM 434 storing a set of machine readable instructions 428 executable by one or more of the processor resources 424-1, 424-2 . . . 424-N, as described herein. The computing device 426 may include memory resources 430, and the processor resources 424-1, 424-2 . . . 424-N may be coupled to the memory resources 430.

Processor resources 424-1, 424-2 . . . 424-N can execute machine-readable instructions 428 that are stored on an internal or external non-transitory MRM 434. A non-transitory MRM (e.g., MRM 334), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), flash memory, etc., as well as other types of machine-readable media.

The non-transitory MRM 334 can be integral, or communicatively coupled, to a computing device, in either in a wired or wireless manner. For example, the non-transitory machine-readable medium can be an internal memory, a portable memory, a portable disk, or a memory associated with another computing resource (e.g., enabling the machine-readable instructions to be transferred and/or executed across a network such as the Internet).

The MRM 434 can be in communication with the processor resources 424-1, 424-2 . . . 424-N via a communication path 432. The communication path 432 can be local or remote to a machine associated with the processor resources 424-1, 424-2 . . . 424-N. Examples of a local communication path 432 can include an electronic bus internal to a machine such as a computer where the MRM 434 is one of volatile, non-volatile, fixed, and/or removable storage medium in communication with the processor resources 424-1, 424-2 . . . 424-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 432 can be such that the MRM 434 is remote from the processor resources (e.g., 424-1, 424-2 . . . 424-N) such as in the example of a network connection between the MRM 434 and the processor resources (e.g., 424-1, 424-2 . . . 424-N). That is, the communication path 432 can be a network connection. Examples of such a network connection can include a local area network (LAN), a wide area network (WAN), a personal area network (PAN), and the Internet, among others. In such examples, the MRM 434 may be associated with a first computing device and the processor resources 424-1, 424-2 ... 424-N may be associated with a second computing device (e.g., a Java application server).

The processor resources 424-1, 424-2 ... 424-N coupled to the memory 430 can create a first depth mask from a first frame and a second depth mask from a second frame to obtain depth information. The processor resources 424-1, 424-2 ... 424-N coupled to the memory 430 can define a first list of feature points from the pixels in the first frame and a second list of feature points from the pixels in the second frame. The processor resources 424-1, 424-2 ... 424-N coupled to the memory 430 can compare feature points from the first list of feature points with feature points from the second list of feature points to find a number of common feature point pairs. Furthermore, the processor resources 424-1, 424-2 ... 424-N coupled to the memory 430 can create a number of common depth objects from the common feature point pairs. In addition, the processor resources 424-1, 424-2 ... 424-N coupled to the memory 430 can perform a best fit operation on the common depth objects to create a number of motion matrices. The processor resources 424-1, 424-2 ... 424-N coupled to the memory 430 can include the motion matrices that do not contain subject motion in a correction matrix where a motion matrix contains subject motion when the motion matrix differs from the majority of the motion matrices. Moreover, the processor resources 424-1, 424-2 ... 424-N coupled to the memory 430 can apply the inverse of the correction matrix to the second frame to perform video stabilization.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A method for depth mask assisted video stabilization comprising:
    creating a first depth mask from a first frame and a second depth mask from a second frame to obtain depth information;
    defining a first list of feature points from the first frame and a second list of feature points from the second frame;
    comparing feature points from the first list of feature points with feature points from the second list of feature points to find a number of common feature point pairs;
    creating a number of motion matrices from the common feature point pairs;
    including the motion matrices in a correction matrix; and
    applying the inverse of the correction matrix to the second frame to perform video stabilization.

2. The method of claim 1, wherein defining the first list of feature points includes grouping pixels that are at a common depth and qualifying feature points based on contrast, uniqueness, and spatial location.

3. The method of claim 1, wherein comparing feature points includes comparing feature points that are at a common depth.

4. The method of claim 1, wherein including the motion matrices in a correction matrix includes including those motion matrices in the correction matrix that do not have subject motion where subject motion is determined by a particular motion matrix that differs from a majority of the motion matrices.

5. The method of claim 4, wherein creating a number of motion matrices from the common feature point pairs includes performing the best fit operation on the common feature point pairs to create the motion matrices.

6. A system for depth mask assisted video stabilization, comprising:
    a memory;
    a processor coupled to the memory to:
        create a first depth mask from a first frame and a second depth mask from a second frame to obtain depth information;
        define a first list of depth objects from the first frame and a second list of depth objects from the second frame;
        compare depth objects from the first list of depth objects with depth objects from the second list of depth objects to find a number of common depth object pairs;
        perform a best fit operation on the common depth object pairs to create a number of motion matrices;
        include the motion matrices in a correction matrix; and
        apply the inverse of the correction matrix to the second frame to perform video stabilization.

7. The system of claim 6, wherein pixels at a common depth are grouped together to define depth objects.

8. The system of claim 7, wherein a pixel's depth is defined by reference to the corresponding depth mask.

9. The system of claim 6, wherein depth objects from the first list of depth objects and depth objects from the second list of depth objects are compared if the depth objects are at a common depth.

10. The system of claim 6, wherein the motion matrices that contain subject motion are removed from the correction matrix before the correction matrix is applied to the second frame where a motion matrix contains subject motion when the motion matrix differs from the majority of the motion matrices.

11. A non-transitory computer-readable medium storing instructions for depth mask assisted video stabilization executable by a computer to cause a computer to:
    create a first depth mask from a first frame and a second depth mask from a second frame to obtain depth information;
    define a first list of feature points from the pixels in the first frame and a second list of feature points from the pixels in the second frame;
    compare feature points from the first list of feature points with feature points from the second list of feature points to find a number of common feature point pairs;
    create a number of common depth objects from the common feature point pairs;
    perform a best fit operation on the common depth objects to create a number of motion matrices;
    include the motion matrices that do not contain subject motion in a correction matrix where a motion matrix contains subject motion when the motion matrix differs from the majority of the motion matrices; and
    apply the inverse of the correction matrix to the second frame to perform video stabilization.

12. The medium of claim 11, wherein the best fit operation that is performed on the common depth objects includes performing the best fit operation on the common feature point pairs that compose a common depth object.

13. The medium of claim 11, wherein feature points from the first list of feature points and feature points from the second list of feature points are compared if the feature points are at a common depth.

14. The medium of claim 11, wherein a common depth object is created by grouping a number of common feature point pairs.

15. The medium of claim 14, wherein the common feature point pairs are grouped together based on depth and spatial location within the first and second frame.

* * * * *